A. KIRBY.
Excavator.
No. 32,194.
2 Sheets—Sheet 1.
Patented April 30, 1861.
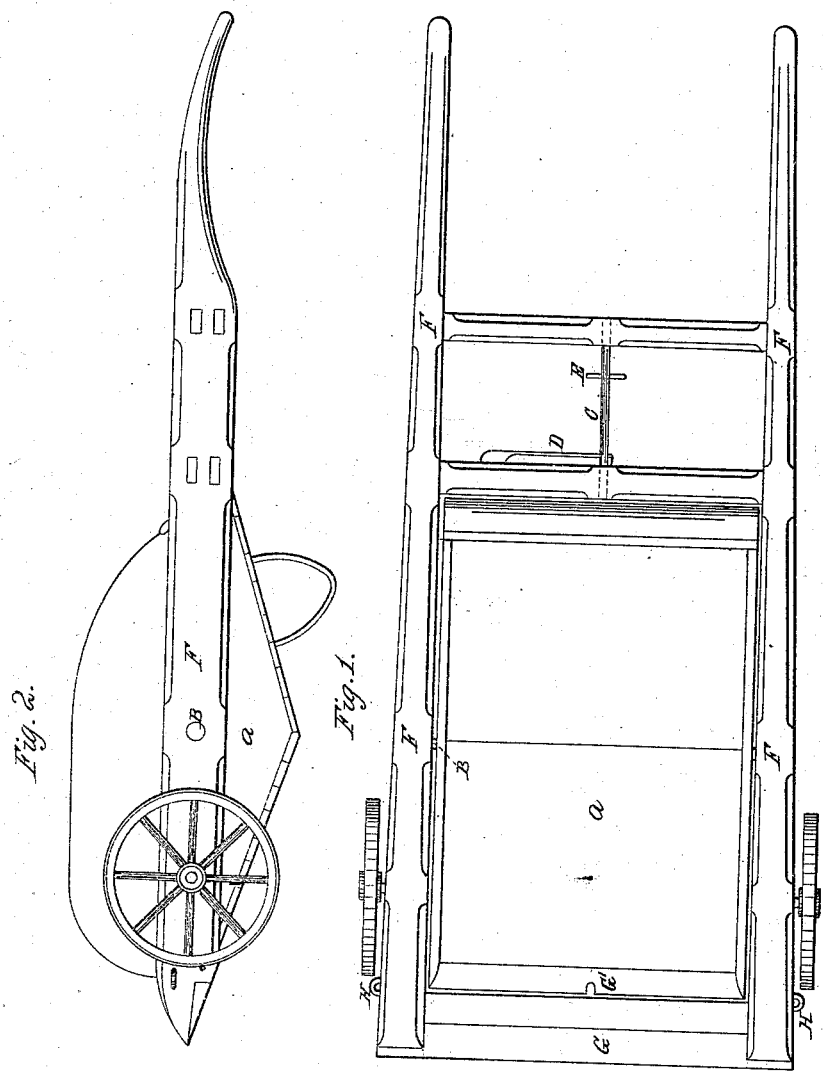
Witnesses:
Inventor:

2 Sheets—Sheet 2.
A. KIRBY.
Excavator.
No. 32,194.
Patented April 30, 1861.
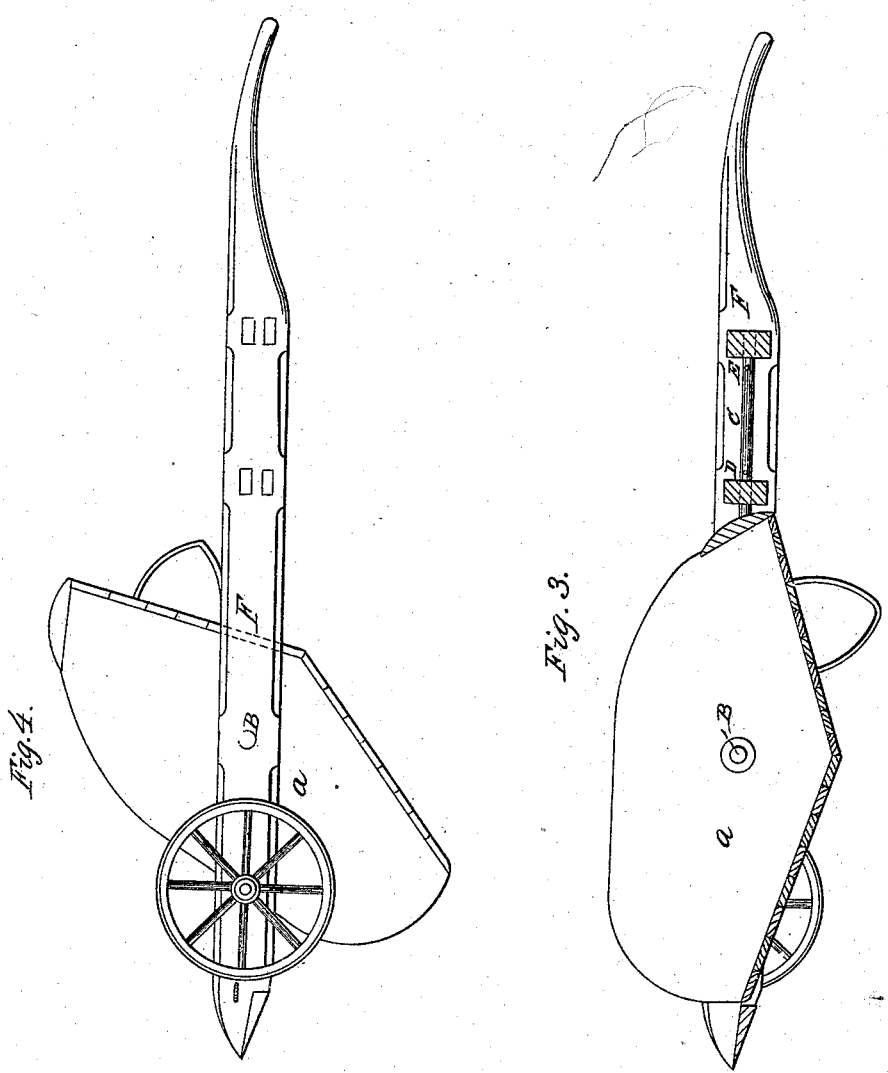

UNITED STATES PATENT OFFICE.

ARCHIBALD KIRBY, OF PARIS, ILLINOIS.

EXCAVATOR.

Specification of Letters Patent No. 32,194, dated April 30, 1861.

*To all whom it may concern:*

Be it known that I, ARCHIBALD KIRBY, of Paris, in the county of Edgar and State of Illinois, have invented a new and useful Machine for the Combined Uses of Excavating and Hauling of Dirt; and I do hereby declare that the following is a full, clear, and exact description of the construction and operation of the same, reference being had to the annexed drawings, making a part of this specification, in which—

Figure 1 is the ground-plan; Fig. 2 a side view; Fig. 3 a longitudinal view; and Fig. 4 a side view showing the shovel or scoop one third revolved.

In Fig. 1 letter A denotes the shovel or scoop; B the centers on which it revolves; C the iron pin by which it is fastened; D the spring that holds the bolt in its place; E the handle of the bolt; F the truck that carries the shovel; G is the iron shoeing on the nose of the truck. H is the staples by which the motive power is fastened to the machine.

The same letters will answer in the other views.

The shovel is to be constructed as shown on the drawings, and placed on its centers and fastened by the iron pin, as shown by letters on Fig. 1.

The machine is so constructed that on being drawn forward the armed edge G of the truck frame excavates the dirt through which it passes, at the same time filling the shovel; it may then be hauled away, and by withdrawing the pin, (letter C, Fig. 1) through the weight of its load the shovel drops in front, and, being placed on centers, by drawing the machine farther forward the shovel makes an entire revolution, by which it empties itself; again coming to its place, it is fastened by a self-acting pin.

What I claim in this invention is—

The combination of a revolving scoop and truck frame provided with a shovel edge G as and for the purposes described.

ARCHIBALD KIRBY.

Witnesses:
 THOS. H. NOSCHOLL,
 GEO. GAVIN.